United States Patent Office 2,888,324
Patented May 26, 1959

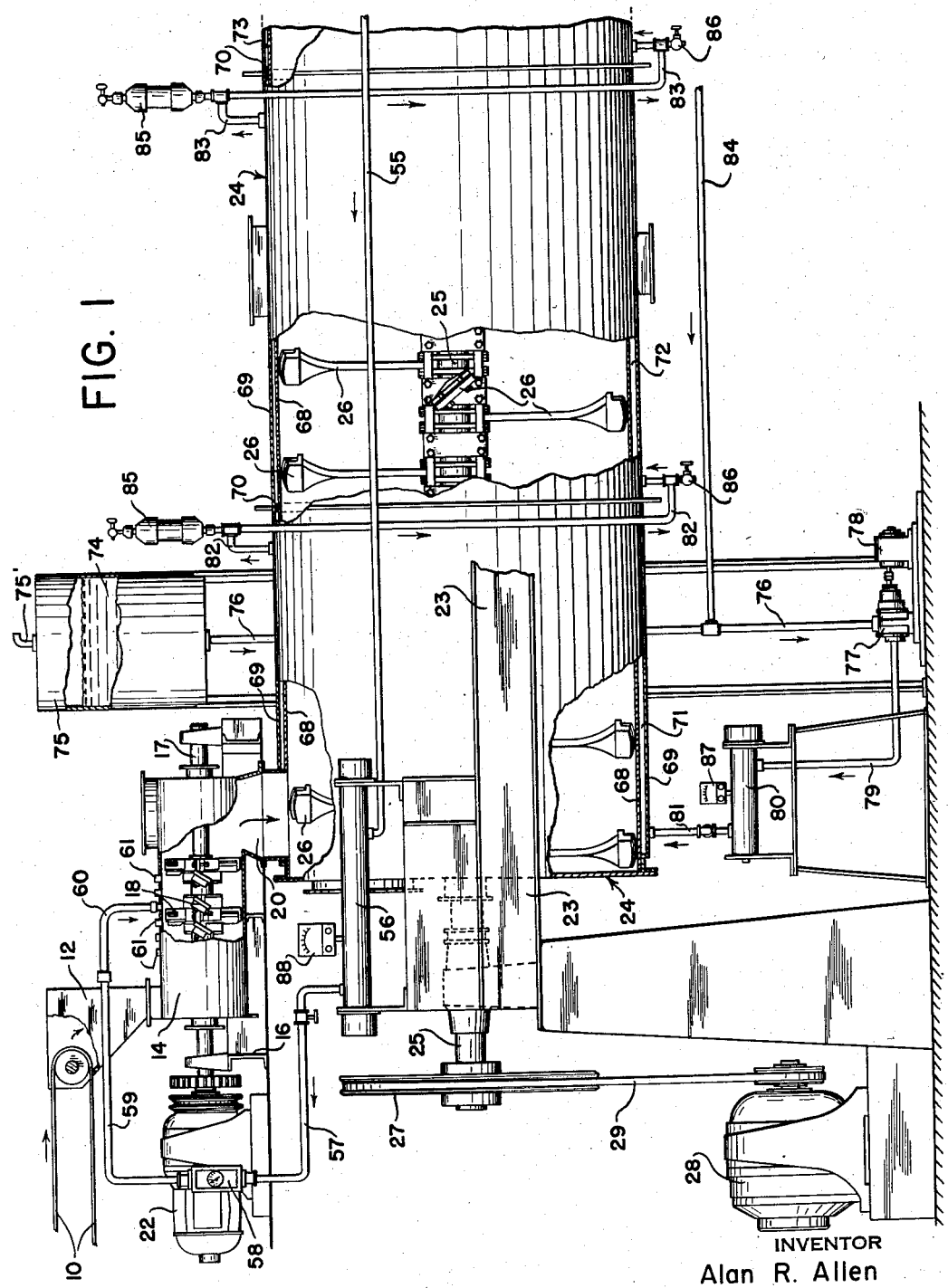

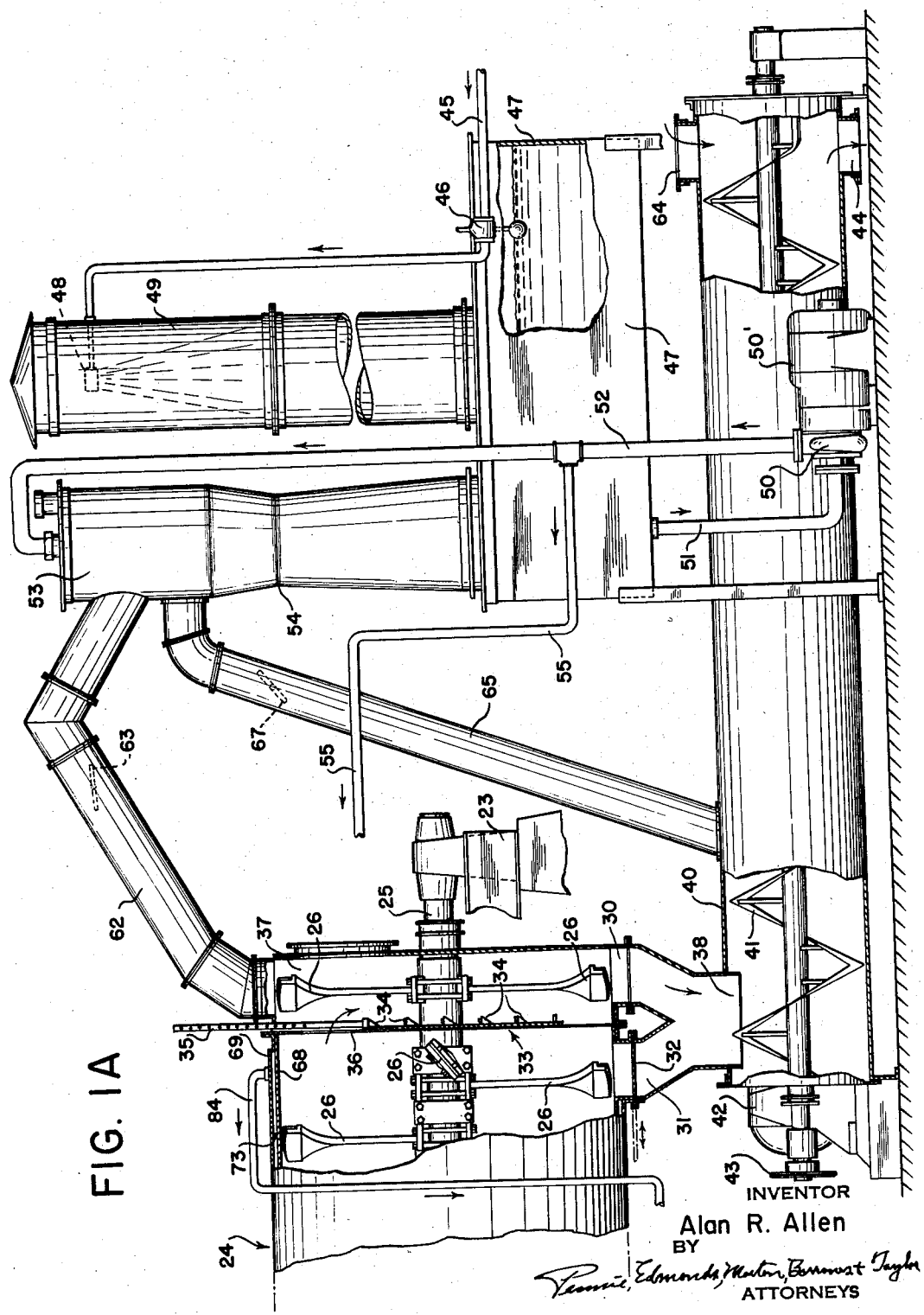

2,888,324

METHOD AND APPARATUS FOR HYDRATING CALCITIC AND DOLOMITIC QUICKLIMES

Alan R. Allen, Belleville, N.J., assignor to Kennedy-Van Saun Mfg. & Eng. Corporation, New York, N.Y., a corporation of Delaware Application July 26, 1955, Serial No. 524,331

16 Claims. (Cl. 23—188)

My invention relates to improvements in method and apparatus for hydrating quick lime and more particularly to the hydration of dolomitic quick lime.

This application is a continuation-in-part of my application Ser. No. 429,570, filed May 13, 1954, now abandoned for "Apparatus for Hydrating Calcitic Limestone and Dolomitic Limestone."

Calcitic quick lime usually consists primarily of calcium oxide with minor percentages of magnesium oxide and impurities, while dolomitic quick limes may contain from 20 to 44% of magnesium oxide and the remainder calcium oxide. It has been recognized that the hydration of dolomitic quick limes presents a problem with respect to obtaining appreciable hydration of the magnesium oxide content of the quick lime. Considerable effort has been spent in trying to solve this problem and as a result, a number of proposals have been advanced for hydration of dolomitic quick limes by carrying out the hydration at superatmospheric pressures. Pressures as high as 600 lbs. per square inch have been suggested. In some instances pressures as low as 50 lbs. or 140 lbs. have also been suggested as sufficient. In all cases, however, it appears that superatmospheric pressure has been generally thought to be necessary in order to obtain any satisfactory hydration of the magnesium oxide content of the quick lime. In a particular instance, the hydration of 85% of the magnesium oxide content of the dolomitic quick lime was regarded as very good.

The primary object of my invention is to provide an improved method by which dolomitic quick lime, as well as calcitic quick lime, may be hydrated without the use of superatmospheric pressures, while at the same time obtaining a very high degree of hydration of magnesium oxide.

A further object of my invention is to provide an improved apparatus, operable at ordinary atmospheric pressures, for effectively hydrating dolomitic quick limes.

In accordance with my invention, dolomitic quick lime is hydrated effectively by feeding it continuously into a mixing zone and therein mixing the quick lime with hot water greatly in excess of the amount of water required for hydration, conducting the resulting mixture into an elongated hydrating zone, in which a considerable body of the material undergoing hydration is maintained, continuously introducing the mixture of quick lime and water into one end of the elongated zone and continuously discharging hydrated lime from the opposite end of the elongated zone. In this operation the hydration is carried out at ordinary atmospheric pressure, or slightly below and the temperature is controlled by cooling or extracting heat from the reaction mixture in the inlet end portion of the hydrating zone and supplying the extracted heat to and heating the reaction mixture in the discharge end portion of the hydrating zone. The major part of the calcium oxide content of the lime, in the case of dolomitic quick limes, is hydrated in the inlet end portion of the hydrating zone, while the major part of the magnesium oxide content of the quick lime is hydrated in the discharge end portion of the hydrating zone.

It has been discovered that a superior product is directly obtained if the temperature in the inlet end portion of the hydrating zone is not allowed to go above a predetermined maximum temperature. This is accomplished by using a large excess of water and cooling the reaction mixture or extracting heat therefrom to restrict the reaction temperature.

It has also been discovered that the magnesium oxide content of the quick lime may be substantially completely hydrated if a sufficient reaction time is allowed and heat is applied to the mixture undergoing hydration in the outlet end portion of the hydrating zone to maintain a suitable reaction temperature. A particular feature of the invention is the transfer of heat from the calcium oxide reaction at the inlet portion of the reaction zone to the magnesium oxide reaction at the outlet portion.

Accordingly, the improved apparatus of the invention comprises an elongated, generally horizontal reaction chamber through which the reaction mass is moved slowly from the inlet to the outlet of the chamber. Means is provided for taking up the heat made available at the inlet portion of the chamber as a result of the hydration of calcium oxide and transferring the heat to the outlet end portion of the reaction chamber to maintain the required reaction temperature for hydrating the magnesium oxide.

The method and apparatus of the present invention have the distinct advantage that they can be operated at ordinary atmospheric pressures and at the same time achieve in excess of 98% hydration of dolomitic quick limes. This is in contrast to the much lower percentages of hydration alleged to be achieved by other methods and apparatus. Furthermore, it is not necessary to build high pressure equipment with all its necessary auxiliaries for high pressure operation, and be subject to the dangers from breakage and explosions.

The improved method and apparatus of the present invention comprise additional features described in detail hereinafter in connection with one embodiment of the apparatus as shown in the accompanying drawings forming a part of this application.

In the drawings:

Figs. 1 and 1A, when placed together end to end, comprise a side elevational view with parts broken away and shown in section of a hydrating apparatus constructed in accordance with the invention, and in which the improved method is adapted to be carried out.

While the method and apparatus is useful in the hydration of calcium oxide quick limes, it is particularly useful in the hydration of dolomitic quick limes. The invention will, therefore, be described and illustrated in connection with the hydration of dolomitic quick limes.

Referring to Fig. 1 of the drawings, the dolomitic quick lime to be hydrated is supplied to the equipment by a weighing device, onto a belt conveyor 10, which may be a part of a continuous weighing device, the belt conveyor delivering the quick lime into a hopper 12, which discharges into a substantially horizontal mixer 14 where the quick lime is mixed with hot water. The mixer 14 is carried on a framework 16 and is provided with a central longitudinal shaft 17 carrying combination mixing and advancing blades 18 by which the mixture of quick lime and water is advanced from left to right into an outlet 20. The blades 18 and the shaft 17 are driven by an electric motor and speed reducer unit 22.

The thoroughly mixed dolomitic quick lime and water delivered through the outlet 20 is charged directly into the inlet end of a relatively large horizontal cylindrical hydrating chamber 24, supported by a frame 23, and provided axially with a drive shaft 25 carrying mixing and advancing blades 26, the shaft 25 carrying a drive pulley 27 driven by an electric motor 28 through a V-belt or chain drive 29. Adjacent blades 26 are arranged at 90° with respect to each other in a spiral pattern and each includes wide shovel-like ends set at an angle for advancing the hydrated lime through the hydrating chamber. The blades 26 are so arranged that they are adapted to sweep and substantially scrape the whole interior surface of the hydrating chamber.

The discharge end of the hydrating chamber 24, as shown in Fig. 1A includes a normal discharge outlet 30 and an emergency discharge outlet 31, the latter of which is provided with an emergency gate 32. In advance of the normal discharge outlet 30, the hydrator is provided with a vertically adjustable dam 33 made up of a plurality of sections 34, each of which includes a plate overlapping a lower plate. The gate itself is expansible and contractable and, as shown, extends above the shaft 25. The height of the gate may be changed and set by an adjusting rod 35 provided with holes for receiving a pin above the shell of the hydrator. Individual sections 34 may be added to or taken out of the dam 33 for adding to or decreasing its height irrespective of its adjustability by reason of the presence of a given number of overlapping sections. In normal operation the cylindrical hydrator 24 is filled to the level of the top of the gate at 36 and the hydrated lime overflows like water into an end compartment 37 and out through the normal discharge outlet 30. A pair of blades 26 are provided on the shaft 25 in the compartment 37 to insure discharge of the hydrated lime.

The hydrated lime delivered through the discharge outlet 30 flows through a larger inlet 38 into a substantially horizontal cylindrical drier 40 provided with a screw band conveyor 41, driven by a motor 42 coupled to a drive wheel 43 mounted on one end of the screw conveyor shaft. The cylindrical drier 40 is not only a drier but also a cooler so that the hydrated lime in a fine fluffy dry state is delivered through an outlet 44 at a temperature suitable for bagging.

The water for use in the hydrating process is delivered through a water supply pipe 45 (Fig. 1A) provided with a float control valve 46 responsive to the water level in a closed water tank 47. Water introduced through the pipe 45 flows directly through a spray head 48 into the upper portion of a spray tower 49 having an open top and being set over the tank 47 so that the water sprayed into the tower is heated and flows directly into the tank 47. A pump 50 driven by a motor 50' draws water from the tank 47 through a pipe 51 and delivers the water under considerable pressure and volume through a pipe 52 and a nozzle into a Venturi type aspirator or ejector 53 having a throat at 54. The water used directly in the hydration is conducted from the pipe 52 through a branch pipe 55, an electric water heater 56 (Fig. 1), a valved pipe 57, a water meter 58, a pipe 59 and a flexible hose connection 60, by which water may be delivered through any one of the longitudinally-spaced inlets 61 in the top of the mixing chamber 14.

The ejector or suction device 53 is used to draw air, moisture and dust from the hydrator 24 and the drying chamber 40. The upper portion of the aspirator is, therefore, connected with the end chamber 37 by a duct 62 provided with a control damper 63. Air is admitted at the discharge end of the drier 40 through an inlet 64 and flows countercurrent to the hydrated lime, and may flow through the elements 38, 30 and 37 to the duct 62. However, a second duct 65 is provided, connecting the upper portion of the suction device 53 with the inlet end portion of the drier 40. This duct is provided with a control damper 67 and, where both ducts 62 and 65 are used, the dampers 63 and 67 are adjusted to regulate the air stream flowing in through the inlet 64 to that required for drying the hydrated lime.

The device 53 places a slightly reduced pressure on the chambers 24 and 40, so that, unless all inlets 61 in the mixer 14 are closed, a small stream of air will be flowing through the hydrator during its operation, thereby picking up moisture and small amounts of dust which flow to the suction device 53. The water spray in the tower 49 is designed to condense moisture from the air flowing therethrough and to hold back any dust that may have passed thereto from the suction device 53, which discharges directly into the top of the closed tank 47. Any hydrated lime dust in the water in the tank 47 is in part recirculated and part conducted to the mixing chamber 14.

An important feature of the invention relates to the structure and operation of the hydrating chamber 24 in connection with the carrying out of the improved method of hydrating dolomitic quick limes. As shown in Figs. 1 and 1A, the cylindrical shell of the hydrator chamber comprises inner and outer shells 68 and 69 spaced apart and forming a jacket throughout the length of the cylindrical chamber, this jacket being divided into three approximately equal lengths by two partition walls 70 (Fig. 1), thereby forming three annular jacket chambers 71, 72 and 73 in series.

The jacket chambers 71, 72 and 73 are filled with a heat transfer liquid which is circulated in series through the jackets in a particular manner and direction. For example, a mineral oil product of Socony Vacuum Oil Company No. 73,301 has been found satisfactory and is designated S-3 heat transfer oil. A supply 74 of this oil is maintained in an elevated tank 75 provided with a breather 75' and arranged to maintain a head of oil above the level of the hydrator 24. A pipe 76 leading from this tank is connected into a pump 77 arranged in an oil circulating system. The pump 77 is driven by a motor 78, and oil being circulated is conducted from the pump through a pipe 79, an electric heater 80, and a pipe 81 into the jacket chamber 71 at the inlet end of the hydrator 24. The oil in this jacket chamber is provided for the express purpose of absorbing heat generated by the hydration of calcium oxide in the dolomitic quick lime and is discharged from the jacket chamber 71 at the top near the partition 70 through piping 82 and delivered to the adjacent bottom portion of the middle jacket chamber 72. Oil is taken from the top opposite end of the jacket chamber 72 through piping 83 and conducted into the bottom adjacent portion of the jacket chamber 73. Heat transfer oil is conducted from the top extreme end of the jacket chamber 73 through piping 84 and into the down pipe 76 leading to the intake of pump 77. The pump 77 causes a forced flow of oil through the chambers 71, 72 and 73 in series and back to the pump, the tank 75 merely serving to maintain the system filled with heat transfer oil. Piping 82 and 83 are provided with air bleed means 85 and with drain valves 86. The oil used as a heat-transfer liquid has the quality of being stable between 212° F. and 350° F.

The piping 82 and 83 respectively extend out and around the hydrator 24 from their inlet and outlet connections, which are preferably located diametrically opposite each other at the top and bottom of the hydrator. If desired, parallel sets of piping with their inlets and outlets respectively slightly spaced from each other may extend around the respective sides of the hydrator for increasing the flow capacity, while the piping 81 and 84 may be of larger diameter.

The jacket provided by the shells 68 and 69 may be divided into two or more jacket chamber in series or a single jacket chamber may be employed, since the oil introduced through the pipe 81 will flow along the bottom of the shell 68, up around it by convection, and toward the outlet piping 84. However, the jacket is preferably divided into a series of chambers, particularly a chamber at the inlet end portion of the hydrator and a chamber at the outlet end portion of the hydrator for securing more effective absorption of heat from the hydration of calcium oxide and the effective transfer of this heat to the zone in which most of the magnesium oxide is hydrated.

In carrying out the improved continuous method in the apparatus as described, reference may be made to a particular example of the treatment of a dolomitic quick lime containing 53% calcium oxide and 46% magnesium oxide. The plant, as shown and described was designed and built for the production of five tons of hydrate per hour.

In starting up the apparatus, oil is circulated through the jacket chambers 71, 72 and 73 in the direction indicated by the arrows adjacent the connecting piping and heated to a temperature of approximately 200° F. by the heater 80, provided with a thermostatic control 87 normally set to cut off the heating current when the temperature of the oil reaches about 200° F. Thereafter, the motors 22, 28 and 50' are placed in operation and feed of the dolomitic quick lime is started. The water heater 56 is previously in operation to heat the water to a temperature of about 200° F. The heater 56 is controlled by a thermostat 88 so that the heating current is cut off when the water reaches approximately 200° F. As the quick lime is fed into the mixer 14, the valve in the pipe 57 is opened and water at 200° F. is delivered through the flexible hose connection 60 into the quick lime. A large excess of water is introduced over that required for reacting with the calcium and magnesium oxides for the production of the hydroxides; 1400 pounds of water per ton of quick lime, i.e. water to the extent of 70% of the quick lime. Slacking of the calcium oxide begins immediately and the mixture is transferred into the long cylindrical hydrator 24.

The hydrator has a capacity to the top of the dam 33 to provide a reaction time of about 1½ hours. The calcium oxide content of the quick lime is completely hydrated by the time it reaches the end of the jacket chamber 71, or at least when part way along the jacket chamber 72. The pump 77 is operated at a sufficient rate to take away a large part of the excess heat generated in the hydration of the calcium oxide, while some of the excess heat is used to vaporize some of the excess water. Furthermore, the rate of oil flow through the jacket chambers 71, 72 and 73 is such that the temperature in the mass is not allowed to rise above a temperature of from 300 to 350° F. during the hydration of the calcium oxide.

The heat absorbed by the oil in the jacket chamber 71, and possibly in part of the jacket chamber 72, is transferred to the remainder of the jacket chamber 72 and to the jacket chamber 73 to supply heat of reaction for the hydration of the magnesium oxide content of the mixture and prevent loss of heat. In the operation referred to, it was found that the oil in the jacket chamber 71, along the zone where most of the heat is created by hydration of calcium oxide, acquired a temperature rise of from 5 to 8° F., even with the rapid oil circulation, and that there would be a corresponding drop in the temperature of the oil to approximately 200° F. in the chamber 73. After the apparatus is once brought into normal operation, sufficient heat is developed in the hydration of calcium oxide to keep the oil at the required temperature, so that the electric oil heater 80 is merely in the circuit and not using heating current, which is under control of the thermostat 87.

The water heater 56 cuts out of operation some time after the apparatus has been started due to the fact that the water in the tank 47, which is being constantly circulated through the ejector cooler 53, is heated up by the hot air and steam drawn through the ducts 62 and 65. Therefore, as soon as the water circulated by the pump 50 reaches a temperature of about 200° F., the heater 56 is out of operation, although water continuously flows therethrough to the mixing chamber 14. With a given rate of feed of the dolomitic quick lime, the rate at which water is supplied to the mixer 14 is regulated by the valve in the pipe 57 to give the required feed rate which is measured by the meter 58.

The hydrated lime produced in the hydrator 24 is a fine powdery material which flows like water over the dam 33 and into the drier 40. This product still contains a considerable part of the excess water added to the mixer 14 and most of this excess is removed by simultaneously drying and cooling the product in the drier 40. The hydrated lime enters the drier at about 198° F. and air drawn through the inlet 64 effects the cooling of the lime down to a temperature of 130° F. to give a fine dry powdered product sufficiently low in temperature to be immediately bagged for shipment. In addition to cooling the hydrated lime in the chamber 40, the air also removes most of the excess water or moisture and the moisture laden air is drawn through either the duct 65 or the duct 62 or both into the ejector and cooler 53.

In the operation described above a type-S dolomitic hydrate was produced which greatly exceeded Government specifications, that is, the degree of hydration of the dolomitic lime was in excess of 98% and the hydrate produced had a plasticity far in excess of 200. Government specifications call for 92% hydrate and a plasticity of 200.

When operations were first started on the apparatus at a particular lime plant, it was run for short periods with increasing proportions of water. At the end of the first short period of operation, the product was examined to find that the hydration exceeded the 60%, which had been obtained on other hydrating equipment at the plant. After the next period of operation, for only a part of one day, the hydrate was examined and found to be more than 70% hydrated. This was so much better than the other hydrating equipment had ever done under the most ideal conditions that considerable surprise and astonishment was exhibited by the operators. In the next part-day run, it was found that 80% hydration was obtained, at which point everyone concerned expressed the view that this seemed impossible and that it just could not be done without the use of superatmospheric pressure. Two further short part-day runs were made in which 90% and 98% hydration were respectively obtained. These results were so unusual and unexpected that everyone concerned was left in wonderment. In later regular operations, hydrations up to 99.5% were obtained, and the quality of the hydrated lime produced both as regards plasticity and water retention far exceeded Government specifications. Two samples of the hydrated dolomitic lime were tested for water retention according to ASTM Specification C 110–49 and the water retention was found to be 95% and 92% respectively. This is well above the requirement of the specification for hydrated lime for masonry purposes, which requires that type S hydrate have a minimum water retention of 85%. Furthermore, while the apparatus was designed for the production of five tons of hydrate per hour, it was run with the same excellent results at six tons per hour without exceeding its capacity.

One of the important results achieved by the process is the direct production of a hydrated dolomitic product which is ready for use and which has the high quality referred to above. This result is in part at least attributable to the temperature control during the hydration of the calcium oxide content of the dolomitic quick lime to avoid a temperature rise above from 300 to 350° F. It was discovered that if the temperature was allowed to exceed approximately 350° F. a condition referred to as "burning" takes place which causes coarse lumps to form in the product and results in a gritty product, instead of the smooth, soft hydrate produced by the process. It has been noted that in at least one patent covering a process for hydrating dolomitic limes under superatmospheric pressure the patentee went into great detail to explain the necessity and advantages of milling the product obtained in the pressure hydration in a ball mill. The use of the large excess of water is also an important factor in the improved process.

The combined steps of the improved process and the particular arrangement of the apparatus solves the problem of effectively hydrating the calcium oxide content of the dolomitic quick lime while at the same time securing a substantially complete hydration of the magnesium oxide content of the quick lime to produce a fine dry smooth dolomitic hydrate of superior quality which is ready for use without subsequent milling or other treatments.

I claim:

1. In apparatus for hydrating calcitic and dolomitic quicklime, a mixer, means for feeding quicklime to be hydrated to the mixer at a constant rate, means for feeding water to the mixer at a constant rate to saturate the quicklime, an elongated cylindrical hydrator connected at one end to the mixer for receiving the water-saturated quicklime therefrom, the hydrator having two outlets at its opposite end, one outlet being for the discharge of the hydrate and the other outlet being for the discharge of surplus water vapor and dust, paddles rotatably mounted in the hydrator for agitating the water-saturated quicklime and for advancing hydrating mixture from the inlet end of the hydrator to the outlet, said paddles being adapted to prevent the adherence of quicklime and hydrate to the hydrator, a jacket filled with a heat-transfer liquid encircling the hydrator, and means for circulating the heat-transfer liquid through the jacket from the feed end to the discharge end of the hydrator for transferring heat absorbed at the feed end portion of the hydrator to the discharge end portion of the hydrator, whereby excess heat generated in the feed end portion of the hydrator is transferred to the discharge end portion of the hydrator to assure substantially complete hydration of the quicklime as it is moved through the hydrator to the discharge end.

2. An apparatus as claimed in claim 1, including means connected into the hydrator outlet for water vapor and dust for drawing water vapor and dust from the hydrator.

3. An apparatus as claimed in claim 2, in which said drawing means comprises a Venturi type ejector, a closed water tank into which the ejector discharges, a pump connected into said tank for circulating water therefrom through the ejector, and a pipe connected into the outlet of said pump for feeding water to the quicklime and water mixer.

4. An apparatus as claimed in claim 3, including a spray tower connected into said tank to receive steam delivered by the ejector and to discharge water into the tank, and means for spraying water into the upper portion of the spray tower.

5. An apparatus as claimed in claim 4, including means for heating the water delivered by the pump through said pipe to the mixer.

6. An apparatus as claimed in claim 1, in which the hydrator is substantially horizontal and the hydrate outlet is located in the lower part of the hydrator, and an overflow dam in the hydrator in front of the hydrate outlet for maintaining a body of quicklime and hydrate in the hydrator to a predetermined level.

7. An apparatus as claimed in claim 1, in which the hydrator is substantially horizontal and the hydrate outlet is located in the lower part of the hydrator, an overflow dam in the discharge end portion of the hydrator in front of and adjacent the hydrate outlet for maintaining hydrate and quicklime in the hydrator to a given level, an emergency hydrate outlet directly in front of said dam, and a closure for the emergency outlet.

8. An apparatus as claimed in claim 1, in which the circulating means for the heat transfer liquid includes a pump, means for connecting the intake and output of the pump respectively with the jacket at the discharge and feed end portions of the hydrator, and means in the output connection of the pump for heating the heat-transfer liquid.

9. An apparatus as claimed in claim 1, including an elongated drying and cooling chamber having an inlet end connected into the hydrate outlet of the hydrator, the drying chamber having a discharge end provided with an air inlet and a hydrate outlet, means connected into the inlet end portion of the drying chamber and into the outlet of the hydrator for water vapor and dust for drawing air, water vapor and dust from the hydrator and drying chamber, a closed water tank into which said drawing means discharges, a spray tower with its lower portion connected into the upper portion of the water tank for receiving air, water vapor and dust therefrom, means for spraying water into the upper portion of said spray tower, and means including a pump for delivering water from said tank into the mixer and comprising said water feeding means.

10. In apparatus for hydrating dolomitic quicklime, a mixer, means for feeding the quicklime to be hydrated to the mixer at a constant rate, means for feeding water to the mixer at a constant rate for wetting the quicklime, an elongated hydrator chamber connected at one end to the mixer for receiving the mixture of quicklime and water from the mixer, the hydrator chamber having two outlets at its opposite end, one outlet being for the discharge of the hydrated lime and the other outlet being for the discharge of surplus water vapor and dust, paddles rotatably mounted in the hydrator for agitating the wetted quicklime and for advancing the mixture and resulting hydrated lime through the hydrator chamber, means filled with a heat-transfer liquid extending the length of the hydrator chamber in heat-transfer relation with the mixture and hydrated lime in the hydrator chamber, and means for circulating the heat-transfer liquid through the liquid-filled means in a direction toward the discharge end of the hydrator chamber for transferring heat absorbed from the mixture and hydrated lime in the feed end portion of the hydrator chamber to the mixture and hydrated lime in the discharge end portion of the hydrator chamber, whereby excess heat generated by the hydration in the feed end portion of the hydrator chamber is transferred to the mixture and hydrated lime in the discharge end portion of the hydrator chamber to assure substantially complete hydration of the dolomitic quicklime as it advances through the hydrator chamber.

11. An apparatus as claimed in claim 10, including piping and pump means for withdrawing liquid from the liquid-filled means at the discharge end portion of the hydrator chamber and for introducing the withdrawn liquid into the liquid-filled means at the feed end portion of the hydrator chamber.

12. In the method of hydrating dolomitic quicklime constituting a mixture of calcium and magnesium oxides in which the magnesium oxide content of the dolomitic quicklime is more difficult to hydrate than the calcium oxide content of the dolomitic quicklime and in which the hydration is carried out in an elongated hydrating zone having inlet and discharge ends, the steps comprising mixing the dolomitic quicklime to be hydrated with water in excess of the amount of water required for the complete hydration of the dolomitic quicklime, advancing the resulting mixture and the hydrate as formed therefrom through said elongated hydrating zone from its inlet end to its discharge end, passing a heat-transfer liquid in heat exchange with but out of direct contact with the mixture in the hydrating zone in the direction of advance of the mixture through the hydrating zone, said heat-transfer liquid having a temperature along the inlet end portion of the hydrating zone such that it absorbs heat from the mixture undergoing hydration in the inlet end portion of the hydrating zone where hydration of the calcium oxide content of the dolomitic quicklime primarily takes place, said heat-transfer liquid having a temperature along the discharge end portion of the hydrating zone such that it transfers heat to the mixture in the discharge end portion of the hydrating zone where the hydration of the magnesium oxide content of the mixture is completed, thereby controlling the hydration temperatures in the inlet and discharge end portions of the elongated hydrating zone, and discharging the resulting dolomitic hydrate at the discharge end of the hydrating zone.

13. The method as claimed in claim 12, in which the heat-transfer liquid is an oil having the quality of being stable to heat between 212° F. and 350° F.

14. The method as claimed in claim 12, including the steps of circulating the heat-transfer liquid outside the hydrating zone from the discharge end portion thereof to the inlet end portion of the hydrating zone to supply the liquid passed in heat exchange with the mixture undergoing hydration in the hydrating zone.

15. The method as claimed in claim 12, including the steps of providing the heat-transfer liquid along the inlet end portion of the hydrating zone at a temperature such as to prevent the rise of the hydration temperature to a point above 350° F. in the inlet end portion of the hydrating zone.

16. In the method of hydrating dolomitic quicklime constituting a mixture of calcium and magnesium oxides, in which the magnesium oxide content of the dolomitic quicklime is more difficult to hydrate than the calcium oxide content of the dolomitic quicklime and in which the hydration is carried out in an elongated hydrating zone having inlet and discharge ends, the steps comprising mixing the dolomitic quicklime to be hydrated with water in excess of the amount of water required for the complete hydration of the dolomitic quicklime, advancing the resulting mixture and the hydrate as formed therefrom through said elongated hydrating zone from its inlet end to its discharge end, maintaining a body of the dolomitic quicklime and hydrate thereof in the hydrating zone, passing a heat-transfer liquid along the hydrating zone in heat exchange with but out of direct contact with the body of the mixture in the hydrating zone from the inlet end to the discharge end in the direction of advance of the mixture through the hydrating zone, said heat-transfer liquid having a temperature along the inlet end portion of the hydrating zone such that it absorbs heat from the mixture undergoing hydration in the inlet end portion of the hydrating zone where hydration of the calcium oxide content of the dolomitic quicklime primarily takes place and prevents the temperature therein from rising above 350° F., said heat-transfer liquid having a temperature along the discharge end portion of the hydrating zone such that it transfers heat to the mixture in the discharge end portion of the hydrating zone where the hydration of the magnesium oxide content of the mixture is completed, thereby controlling the hydration temperatures in the inlet and discharge end portions of the elongated hydrating zone, said heat-transfer liquid being cooled along the discharge end portion of the hydrating zone, circulating the resulting cooled heat-transfer liquid outside the hydrating zone from the discharge end to the inlet end to supply the heat-transfer liquid to the inlet end portion of the hydrating zone, and discharging the resulting dolomitic hydrate at the discharge end of the hydrating zone.

References Cited in the file of this patent

UNITED STATES PATENTS

| Number | Name | Date |
|---|---|---|
| 807,609 | Ellis | Dec. 26, 1903 |
| 1,066,718 | Doherty | July 8, 1913 |
| 1,067,686 | Schulthess | July 15, 1913 |
| 1,204,700 | Schofield | Nov. 14, 1916 |
| 1,255,268 | Zimmerman | Feb. 5, 1918 |
| 1,832,148 | Spoerri | Nov. 17, 1931 |
| 1,954,211 | Kuntz | Apr. 10, 1934 |
| 2,254,688 | Kuntz | Sept. 22, 1941 |
| 2,518,046 | Miller | Aug. 8, 1950 |
| 2,560,016 | Walker | July 10, 1951 |
| 2,560,316 | Walker | July 10, 1951 |